(12) United States Patent
Ohnishi et al.

(10) Patent No.: US 12,285,862 B2
(45) Date of Patent: Apr. 29, 2025

(54) POSITION/FORCE CONTROLLER, AND POSITION/FORCE CONTROL METHOD AND STORAGE MEDIUM

(71) Applicants: KEIO UNIVERSITY, Tokyo (JP); Motion Lib, Inc., Kawasaki (JP)

(72) Inventors: Kouhei Ohnishi, Kanagawa (JP); Takahiro Nozaki, Kanagawa (JP); Takahiro Mizoguchi, Kanagawa (JP)

(73) Assignees: KEIO UNIVERSITY, Tokyo (JP); MOTION LIB, INC., Kanagawa (JP)

( * ) Notice: Subject to any disclaimer, the term of this patent is extended or adjusted under 35 U.S.C. 154(b) by 543 days.

(21) Appl. No.: 17/429,240

(22) PCT Filed: Feb. 7, 2020

(86) PCT No.: PCT/JP2020/004933
§ 371 (c)(1),
(2) Date: Aug. 6, 2021

(87) PCT Pub. No.: WO2020/162619
PCT Pub. Date: Aug. 13, 2020

(65) Prior Publication Data
US 2022/0134542 A1    May 5, 2022

(30) Foreign Application Priority Data
Feb. 7, 2019  (JP) .................. 2019-021104

(51) Int. Cl.
*B25J 9/16* (2006.01)
*B25J 3/04* (2006.01)
*G05B 19/4155* (2006.01)

(52) U.S. Cl.
CPC .............. *B25J 9/1602* (2013.01); *B25J 3/04* (2013.01); *B25J 9/1633* (2013.01); *B25J 9/1651* (2013.01);
(Continued)

(58) Field of Classification Search
CPC . B25J 9/1602; B25J 3/04; B25J 9/1633; B25J 9/1651; G05B 19/4155; G05B 2219/50391
(Continued)

(56) References Cited

U.S. PATENT DOCUMENTS 7,731,670 B2 *  6/2010  Aguirre-Ollinger .................. A61H 1/0237
                                                                                              601/5
8,185,243 B2 *  5/2012  Okazaki ............... B25J 9/1075
                                                                              901/29
(Continued)

FOREIGN PATENT DOCUMENTS

CN    104283484 A    1/2015
JP    H07295650 A    11/1995
(Continued)

OTHER PUBLICATIONS

Dinesh Rabindran et al., Parametric Design of Parallel Force/Velocity Actuators: Force Distribution Analysis, Feb. 2010 ASME, vol. 2, pp. 1-14 (pdf).*
(Continued)

*Primary Examiner* — Manglesh M Patel
(74) *Attorney, Agent, or Firm* — Holtz, Holtz & Volek PC (57) ABSTRACT

A position/force controller performs a first conversion for distributing control energy to at least one of velocity or position energy and force energy, in accordance with a function to be realized, based on velocity (or position) and force information, which correspond to information relating to a position based on an operation of an actuator, and information serving as reference of control. The position/force controller calculates at least one of a velocity or position control amount and a force control amount based on at least one of the energies obtained through the distribution. The position/force controller integrates the calculated con-
(Continued)

trol amounts, performs a second conversion, and determines input to the actuator. The position/force controller performs a process, corresponding to increasing or decreasing performed on at least one of the velocity or position energy and the force energy together or independently, with satisfaction of a condition set for the control energy.

7 Claims, 6 Drawing Sheets (52) U.S. Cl.
CPC ............. *G05B 19/4155* (2013.01); *G05B 2219/50391* (2013.01)

(58) Field of Classification Search
USPC .......................................... 700/250, 245, 262
See application file for complete search history.

(56) References Cited

U.S. PATENT DOCUMENTS

| | | | | |
|---|---|---|---|---|
| 9,623,567 | B2* | 4/2017 | Iwatake | B25J 13/085 |
| 10,059,001 | B2* | 8/2018 | Miyazawa | B25J 9/1697 |
| 2002/0022907 | A1* | 2/2002 | Takenaka | B62D 57/02 |
| | | | | 700/245 |
| 2007/0112466 | A1 | 5/2007 | Ohnishi et al. | |
| 2009/0132088 | A1* | 5/2009 | Taitler | G05B 19/42 |
| | | | | 700/264 |
| 2011/0060460 | A1* | 3/2011 | Oga | B25J 9/1633 |
| | | | | 700/254 |
| 2011/0089884 | A1* | 4/2011 | Harke | G05B 19/404 |
| | | | | 318/625 |
| 2011/0270507 | A1* | 11/2011 | Worthing | F02D 41/042 |
| | | | | 701/102 |
| 2015/0008861 | A1 | 1/2015 | Sonoda | |
| 2015/0088309 | A1* | 3/2015 | Doll | G05B 13/04 |
| | | | | 901/15 |
| 2015/0137727 | A1 | 5/2015 | Furutani et al. | |
| 2016/0207196 | A1 | 7/2016 | Ohnishi et al. | |
| 2019/0119886 | A1* | 4/2019 | Izumi | E02F 9/20 |
| 2019/0143510 | A1 | 5/2019 | Ohnishi et al. | |
| 2019/0367029 | A1* | 12/2019 | Martinez Ruvalcaba | |
| | | | | B60W 50/082 |
| 2020/0206893 | A1* | 7/2020 | Shimomura | B25J 9/1687 |
| 2020/0323657 | A1* | 10/2020 | Pande | A61H 1/0285 |
| 2020/0376681 | A1 | 12/2020 | Ohnishi et al. | |
| 2021/0107134 | A1 | 4/2021 | Shimono et al. | |
| 2021/0213602 | A1* | 7/2021 | Yang | B25J 9/0084 |
| 2022/0331025 | A1* | 10/2022 | Hourtash | A61B 17/29 |
| 2023/0143373 | A1* | 5/2023 | Shimono | A61B 17/1626 |
| | | | | 606/80 |
| 2023/0144236 | A1* | 5/2023 | Kaneda | A61H 7/004 |
| | | | | 601/136 |
| 2023/0240776 | A1* | 8/2023 | Liao | A61B 34/70 |
| | | | | 606/130 |
| 2024/0405713 | A1* | 12/2024 | Wang | H02P 29/032 |

FOREIGN PATENT DOCUMENTS

| | | |
|---|---|---|
| JP | 2007274783 A | 10/2007 |
| JP | 2009279699 A | 12/2009 |
| WO | 2005109139 A1 | 11/2005 |
| WO | 2013108356 A1 | 7/2013 |
| WO | 2015041046 A1 | 3/2015 |

OTHER PUBLICATIONS

Y.K. Yiu et al., Trajectory Generation for a 2-dof Over-actuated Parallel Manipulator with Actuator Speed and Torque Limits Consideration, 2003, IEEE International Symposium, pp. 1058-1063.*
U.S. Appl. No. 17/272,439, First Named Inventor: Kouhei Ohnishi; Title: "Function Generation Device, Function Generation Method, and Storage Medium", filed Mar. 1, 2021.
U.S. Appl. No. 17/258,075, First Named Inventor: Tomoyuki Shimono; Title: "Medical Gripping Device", filed Jan. 5, 2021.
International Search Report (ISR) (and English language translation thereof) dated Mar. 17, 2020 issued in International Application No. PCT/JP2020/004933.
Written Opinion dated Mar. 17, 2020 issued in International Application No. PCT/JP2020/004933.
Indian Office Action dated Mar. 11, 2024, issued in counterpart Indian Application No. 202117040092.

* cited by examiner

FIG. 6

POSITION/FORCE CONTROLLER, AND POSITION/FORCE CONTROL METHOD AND STORAGE MEDIUM

TECHNICAL FIELD

The present invention relates to a position/force controller that controls positions and forces of a control object, and to a position/force control method and storage medium.

BACKGROUND ART

Heretofore, in the context of an ageing society and suchlike, there have been strong calls to replace humans with robots for tasks that take time and effort.

However, operations of conventional robots are lacking in environmental adaptability and flexibility; human-like movements have not yet been appropriately realized.

Efforts have been made to use time-series position information and force information acquired by a master/slave system to artificially reproduce the movements of actuators. However, mechanical impedance is always constant during these reproductions; as yet, adaptability to environmental changes such as positions in an environment, sizes and mechanical impedances has been lacking.

Techniques relating to robots that perform remote control through master/slave systems are recited in, for example, Patent Document 1 and Patent Document 2.

CITATION LIST

Patent Literature

Patent Document 1: PCT international Publication No. WO2005/109139
Patent Document 2: Japanese Unexamined Patent Application, Publication No. 2009-279699

SUMMARY OF INVENTION

Technical Problem

Both a high level of environmental adaptability through high-precision force control and sampling of movements in a human coordinate system by a system with many degrees of freedom are extremely important for realizing the replacement of humans with robots for tasks that take time and effort. This has not yet been realized by conventional techniques.

In addition to simple realization of human-like movements, robots in the future are required to realize, for example, functions obtained by extending the ability of humans and functions which humans do not have.

That is, the conventional techniques may be improved in appropriate realization of functions required for robots.

Solution to Problem

A position/force controller according to an aspect of the present invention includes:
  a function-dependent force/velocity distribution converter for performing a first conversion for distributing control energy to at least one of velocity or position energy and force energy, the distributing being performed in accordance with a function to be realized, the distributing being performed on the basis of velocity or position information and force information and information serving as reference of control, the velocity or position information and force information corresponding to information relating to a position based on an operation of an actuator;
  a control-amount calculator for calculating at least one of a velocity or position control amount and a force control amount, the calculating being performed on the basis of at least one of the velocity or position energy and the force energy, the velocity or position energy and the force energy being determined through the distribution performed by the function-dependent force/velocity distribution converter; and
  an integrator for integrating the velocity or position control amount with the force control amount, performing a second conversion on the velocity or position control amount and the force control amount so as to return the integrated output to the actuator, and determining input to the actuator,
wherein the determining input to the actuator from the distribution result of the control energy obtained through the first conversion includes an increase/decrease process corresponding to increasing or decreasing performed on at least one of the velocity or position energy and the force energy together or independently, the increase/decrease process being performed with satisfaction of a condition that is set for the control energy.

Advantageous Effects of Invention

The present invention may provide a technique for more appropriately realizing functions required for robots.

DESCRIPTION OF EMBODIMENT

Herebelow, an embodiment of the present invention is described with reference to the attached drawings.

First, a basic principle employed in the position/force controller, position/force control method and program according to the present invention is described.

Human-like movements are constituted by the particular functioning of individual joints and the like separately or in combination.

Accordingly, the term "movement" as used in the present embodiment herebelow refers to an integrated function in which the particular "functions" of portions of the human body are realized as constituent elements. For example, a movement associated with flexing and extension of a middle finger (a movement to turn a bolt or the like) is an integrated function in which the functions of respective joints of the middle finger are constituent elements.

Basic Principle

The basic principle of the present invention is that any movement can be mathematically represented by three elements: a force origin, a velocity (or position) origin and a conversion representing the movement. Therefore, by control energy from an ideal force origin and an ideal velocity (position) origin, which have a duality relationship, being supplied to a control object system in accordance with a set of variables defined by a conversion and a reverse conversion, a sampled human body movement may be constituted, reconstructed and/or amplified to reversibly and automatically realize (reproduce) the body movement.

When the simple reverse conversion of a conversion representing a movement is performed, the movement may be reproduced. However, in the present invention, a conversion different from the reverse conversion of a conversion representing a movement is performed. Thus, while the control energy is flexibly controlled in a target state, necessary power may be supplied to a control object system.

Figure 1:
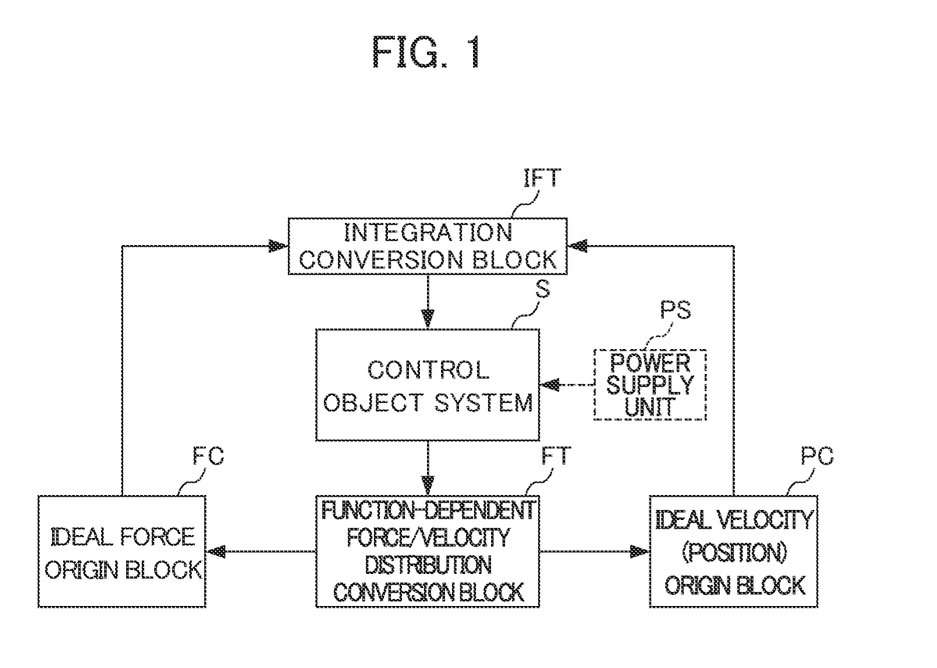
FIG. 1 is a schematic diagram showing an overview of the basic principle relating to the present invention.

FIG. 1 is a schematic diagram showing an overview of the basic principle relating to the present invention.

The basic principle as shown in FIG. 1 represents control rules of an actuator that can be used for realizing human-like movements. An operation of the actuator may be determined by performing computations in at least one of a position (or velocity) domain and a force domain, using a current position of the actuator as an input.

That is, the basic principle of the present invention is represented by the control rules including a control object system S, a function-dependent force/velocity distribution conversion block FT, at least one of an ideal force origin block FC and an ideal velocity (position) origin block PC, an integration conversion block IFT, and a power supply unit PS.

The control object system S is a robot that operates through an actuator/actuators. The control object system S controls each actuator on the basis of acceleration or the like. The control object system S realizes functions of one or plural portions of a human body. Provided the control object system S employs control rules for realizing these functions, the concrete structure of the control object system S does not necessarily need to be in a form that resembles the human body. For example, the control object system S may be a robot that moves a link in a one-dimensional sliding operation with an actuator.

The function-dependent force/velocity distribution conversion block FT is a block that defines a conversion of control energy in the velocity (position) and force domains, which is specified in accordance with a function of the control object system S. Specifically, the function-dependent force/velocity distribution conversion block FT defines a coordinate conversion whose inputs are a value serving as a reference for the function of the control object system S (a reference value) and the current position of an actuator. The coordinate conversion is, generally speaking, a conversion of an input vector whose elements are a reference value of velocity (position) and a current velocity (position) to an output, vector constituted with a velocity (position) for calculating a control target value of velocity (position), and a conversion of an input vector whose elements are a reference value of force and a current force to an output vector constituted with a force for calculating a control target value of force. To be specific, the coordinate conversion by the function-dependent force/velocity distribution conversion block FT can be generalized and expressed as in the following Expressions (1) and (2).

[Math. 1]

$$\begin{pmatrix} \dot{x}_1 \\ \dot{x}_2 \\ \vdots \\ \dot{x}_{n-1} \\ \dot{x}_n \end{pmatrix} = \begin{pmatrix} h_{1a} & h_{1b} & \cdots & h_{1(n-1)} & h_{1n} \\ h_{2a} & h_{2b} & \cdots & h_{2(n-1)} & h_{2n} \\ \vdots & \vdots & \ddots & \vdots & \vdots \\ h_{(n-1)a} & h_{(n-1)b} & \cdots & h_{(n-1)(m-1)} & h_{(n-1)m} \\ h_{ma} & h_{mb} & \cdots & h_{n(m-1)} & h_{nm} \end{pmatrix} \begin{pmatrix} \dot{x}_a \\ \dot{x}_b \\ \vdots \\ \dot{x}_{m-1} \\ \dot{x}_m \end{pmatrix} \quad (1)$$

$$\begin{pmatrix} f_1 \\ f_2 \\ \vdots \\ f_{n+1} \\ f_n \end{pmatrix} = \begin{pmatrix} h_{1a} & h_{1b} & \cdots & h_{1(n-1)} & h_{1n} \\ h_{2a} & h_{2b} & \cdots & h_{2(n-1)} & h_{2n} \\ \vdots & \vdots & \ddots & \vdots & \vdots \\ h_{(n-1)a} & h_{(n-1)b} & \cdots & h_{(n-1)(m-1)} & h_{(n-1)m} \\ h_{ma} & h_{mb} & \cdots & h_{n(m-1)} & h_{nm} \end{pmatrix} \begin{pmatrix} f_a \\ f_b \\ \vdots \\ f_{m+1} \\ f_m \end{pmatrix} \quad (2)$$

In Expression (1), $x'_1$ to $x'_n$ (n is an integer that is at least 1) represent velocity vectors for calculating a state value of velocity, $x'_a$ to $x'_m$ (m is an integer that is at least 1) represent vectors whose elements are a reference value and a velocity based on an action of the actuator (a velocity of a moving element of the actuator or a velocity of an object being moved by the actuator), and $h_{1a}$ to $h_{nm}$ represent elements of a conversion matrix representing the function. In Expression (2), $f''_1$ to $f''_n$ (n is an integer that is at least 1) represent force vectors for calculating a state value of force, and $f''_a$ to $f''_m$ (m is an integer that is at least 1) represent vectors whose elements are a reference value and a force based on an action of the actuator (a force of a moving element of the actuator or a force of the object being moved by the actuator).

By the coordinate conversion by the function-dependent force/velocity distribution conversion block FT being specified in accordance with the function to be realized, various movements may be realized and movements may be reproduced with scaling.

That is, in the basic principle of the present invention, the function-dependent force/velocity distribution conversion block FT "converts" a variable of an actuator unit (a variable in real space) to a set of variables (variables in virtual space) for the whole system representing the function to be realized, and distributes control energy to velocity (position) control energy and force control energy. Therefore, in contrast to a case in which control is performed using unmodified variables of actuator units (variables in real space), the velocity (position) control energy and force control energy may be given separately.

The ideal force origin block FC is a block that performs computations in the force domain in accordance with the coordinate conversion defined by the function-dependent force/velocity distribution conversion block FT. The ideal force origin block FT sets a target value relating to force in performing a computation on the basis of the coordinate conversion defined by the function-dependent force/velocity distribution conversion block FT. For example, if the function being realized is the same as the function represented by the reference value, the target value is set to zero.

For example, if the function being realized is the same as the function represented by the reference value, the target value is set to zero, and if scaling is to be applied, information representing the function being reproduced is set to a magnified or reduced value. The ideal velocity (position) origin block PC sets a target value relating to velocity (position) in performing a computation on the basis of the coordinate conversion defined by the function-dependent force/velocity distribution conversion block FT. The target value is set as a fixed value or a variable value, depending on the function being realized. For example, if the function being realized is the same as the function represented by the reference value, the target value is set to zero.

The integration conversion block IFT is a block which defines conversion (second conversion) from values in the velocity (position) and force domains into input domain values (for example, voltage values or current values) that are input to the control object system S. In the present invention. The integration conversion block IFT is capable of setting content different from the simple reverse conversion of the conversion performed in the function-dependent force/velocity distribution conversion block FT. In terms of a contribution ratio for the control energy, specific conversion content is set. For example, for the force control energy based on force domain values computed by the ideal force origin block PC and the velocity (position) control energy based on velocity (position) domain values computed by the ideal velocity (position) origin block PC, a conversion is performed to change the contribution ratio between the control energies. Thus, the weight of the force control may be increased, or the weight of the velocity (position) control may be increased. In addition, the entire control energy may be increased or decreased to increase or decrease the output of the control object system S relative to the output obtained in the case of the simple reverse conversion of the conversion performed by the function-dependent force/velocity distribution conversion block FT. Specifically, the coordinate conversion performed by the integration conversion block IFT is generalized and expressed as in the following Expression (3).

[Math. 2]

$$\begin{pmatrix} \ddot{X}_a \\ \ddot{X}_b \\ \vdots \\ \ddot{X}_{m-1} \\ \ddot{X}_m \end{pmatrix} = \begin{pmatrix} \alpha_{1a} & \alpha_{1b} & \cdots & \alpha_{1(n-1)} & \alpha_{1n} \\ \alpha_{2a} & \alpha_{2b} & \cdots & \alpha_{2(n-1)} & \alpha_{2n} \\ \vdots & \vdots & \ddots & \vdots & \vdots \\ \alpha_{(m-1)a} & \alpha_{(m-1)b} & \cdots & \alpha_{(m-1)(n-1)} & \alpha_{(m-1)n} \\ \alpha_{ma} & \alpha_{mb} & \cdots & \alpha_{m(n-1)} & \alpha_{mn} \end{pmatrix} \begin{pmatrix} \ddot{X}_1 \\ \ddot{X}_2 \\ \vdots \\ \ddot{X}_{n-1} \\ \ddot{X}_n \end{pmatrix} \quad (3)$$

In Expression (3), $X''_1$ to $X''_n$ (n is an integer that is at least 1) represent an input vector whose elements are acceleration values obtained by integrating the control target values of force in the force domain, which are computed by the ideal force origin block FC, with the control target values of velocity (position) in the velocity (position) domain, which are computed by the ideal velocity (position) origin block PC (that is, acceleration in the virtual space which is to be output by the actuators). $X''_a$ to $X''_m$ (m is an integer that is at least 1) represent command values of acceleration for the actuators (that is, acceleration in the real space which is to be output by the actuators). $\alpha_{1a}$ to $\alpha_{nm}$ represent elements of a coordinate conversion (second conversion matrix) representing the second conversion.

The integration conversion block IFT calculates values (such as current values), which are input to the actuators, from the acceleration values calculated by using Expression (3).

Input values of the actuators, which are calculated through computation using the second conversion matrix the integration conversion block IFT, have control energy obtained by summing the velocity (position) control energy and the force control energy. An operation of an actuator is limited by a condition, such as a limit of the capability of the actuator (for example, a force limit which is a limit of possible output force or a velocity limit which is a limit of possible output velocity). In the present embodiment, a condition relating to the velocity (position) control energy and the force control energy is set so that input values of the actuators, which are calculated by the integration conversion block IFT, do not exceed the limit of the capability of the actuators.

Figure 2:
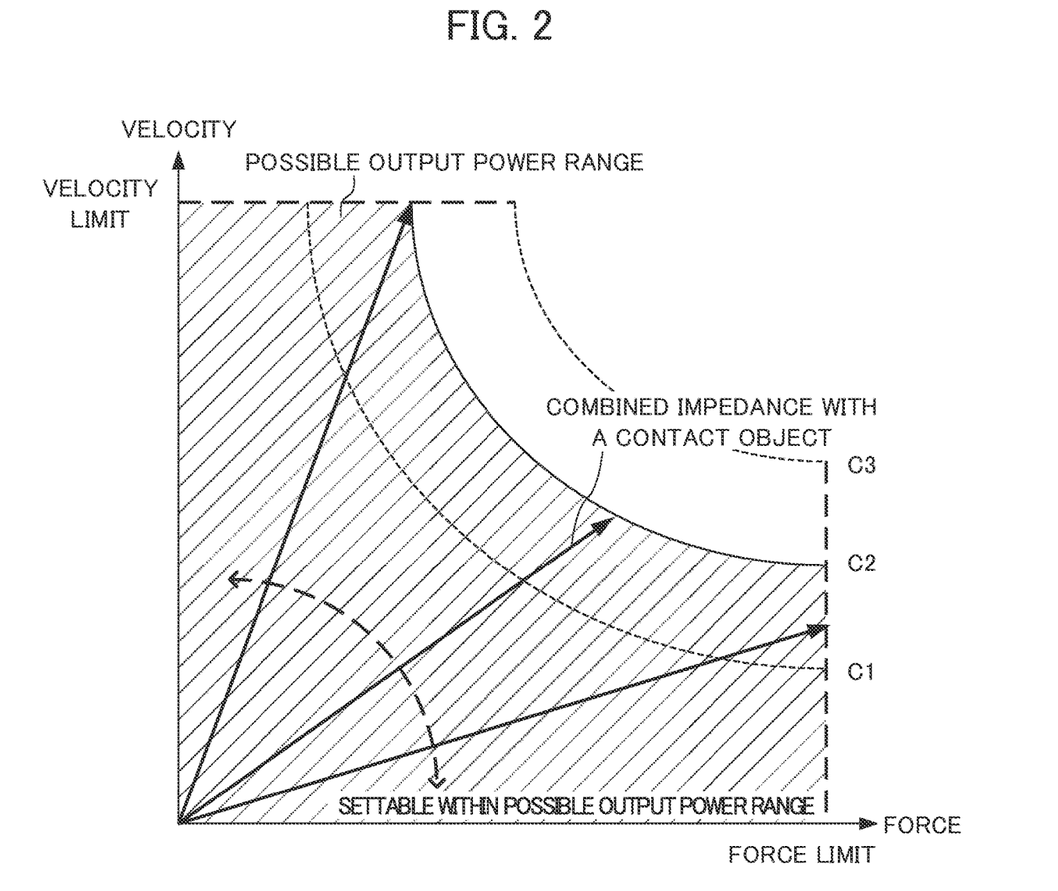
FIG. 2 is a schematic diagram illustrating the relationship between the velocity (position) and the force in input to the actuators.

FIG. 2 is a schematic diagram illustrating the relationship between the velocity (position) and the force in input to the actuators.

As illustrated in FIG. 2, in the basic principle in the present invention, the first conversion causes distribution between velocity (position) control energy and force control energy based on the combined impedance with a contact object. The second conversion is further performed to determine input to the actuators.

When specific control energy is set, curves C1 to C3 in FIG. 2 indicate functions describing that the control energy is maintained before and after the second conversion. That is, in distribution of the control energy which is indicated by any point on curves C1 to C3, if one of the velocity (position) and the force is increased, the other is decreased. Thus, the control energy is maintained as a whole.

In FIG. 2, transition between curves typified by curves C1 to C3 means an increase or a decrease of the whole control energy. The whole control energy increases in the order from curve C1 to curve C3. In the present invention, a distribution point of the control energy may be set at any point which is not limited to the same curve. That is, in the present invention, when at least one of the velocity (position) and the force is increased or decreased together or independently through the second conversion, the distribution point of the control energy may be changed from a curve, on which the control energy is maintained, to a point which is present in a direction in which the control energy is increased or decreased.

In this case, the power, which is to be supplied to the control object system S, is also changed. The power supply unit PS is capable of supplying the power corresponding to this change.

In the present invention, as illustrated in FIG. 2, the range, in which the distribution point of the control energy may be set, is limited to within the range of the force limit and the velocity limit. That is, when the distribution point of the control energy, which is calculated in the second conversion, exceeds the force limit or the velocity limit, the distribution point of the control energy is set to a point at which the upper limit is the force limit or the velocity limit, and input of the actuators is determined. Thus, in the present invention, in terms of control energy, a condition (upper limit value) about the velocity (position) control energy and the force control energy is set.

The power supply unit PS includes a power supply such as a battery and a function of controlling power supply. The power supply unit PS supplies the control object system S with power corresponding to the input of the actuators determined by the integration conversion block IFT. By using the function of controlling power supply in the power supply unit PS, power supply to the control object system S is maintained/increased/decreased in accordance with a change in the control energy which is to be output by the control object system S.

According to the basic principle, when information about the positions of the actuators of the control object system S is input to the function-dependent force/velocity distribution conversion block FT, the function-dependent force/velocity distribution conversion block FT uses information about the velocity (position) and the force, which is obtained on the basis of the position information, to apply the control rules in the position and force domains in accordance with a function. The ideal force origin block FT performs computations on the force in accordance with the function. The ideal velocity (position) origin block PC performs computations on the velocity (position) in accordance with the function. Thus, the control energy is distributed to the force and the velocity (position).

The computation results from the ideal force origin block FC and the ideal velocity (position) origin block PC are information indicating control targets of the control object system S. The computation results are input to the control object system S as input values of the actuators after the integration conversion block. TFT changes the weight in accordance with the contribution ratio, which has been set, between the velocity (position) control energy and the force control energy.

As a result, while the actuators of the control object system S basically follow a function defined by the function-dependent force/velocity distribution conversion block FT, the actuators perform operations, in which the set control amount of the velocity (position) and the set control amount of the force have been increased or decreased together or independently, achieving a robot's target operation.

That is, in the present invention, functions required for a robot may be realized more appropriately.

The function of controlling power supply in the power supply unit PS may be also used to increase or decrease the whole control energy, which is output from the actuators, to achieve an increase or a decrease of the velocity (position) and the force.

Specific Configuration Example

A specific system configuration example, to which the basic principle of the present invention is applied, will be described.

The function-dependent force/velocity distribution conversion block FT defines the coordinate conversion (the conversion (first conversion), which corresponds to a function to be realized, from the real space to the virtual space) whose target is the velocity (position) and the force which are obtained on the basis of the current positions of the actuators which are input.

The function-dependent force/velocity distribution conversion block FT receives the velocity (position) and the force from the current positions, and receives the velocity (position) and the force serving as the reference value of the function. By using these received data, the function-dependent force/velocity distribution conversion block FT applies, in the acceleration dimension, the control rules for the velocity (position) and the force.

That is, the force of an actuator is represented as multiplication of mass and acceleration. The velocity (position) of an actuator is represented as integration of acceleration. Therefore, the velocity (position) and the force are controlled through the acceleration domain. Thus, the current positions of the actuators are obtained to realize the target function.

In the system configuration example below, as described above, for the force control energy, which is based on the values in the force domain computed by the ideal force origin block FC, and the velocity (position) control energy, which is based on the values in the velocity (position) domain computed by the ideal velocity (position) origin block PC, the integration conversion block IFT performs conversion for changing the contribution ratio between the control energies. Thus, the weight of the force control may be increased, or the weight of the velocity (position) control may be increased.

The function-dependent force/velocity distribution conversion block FT defines the coordinate conversion (the conversion, which corresponds to a function to be realized, from the real space to the virtual space) whose target is the velocity (position) and the force which are obtained on the basis of the current positions of the actuators which are input.

The function-dependent force/velocity distribution conversion block Er receives the velocity (position) and the force from the current positions, and receives the velocity (position) and the force serving as the reference value of the function. By using these received data, the function-dependent force/velocity distribution conversion block FT applies, in the acceleration dimension, the control rules for the velocity (position) and the force.

That is, the force of an actuator is represented as multiplication of mass and acceleration. The velocity (position) of an actuator is represented as integration of acceleration. Therefore, the velocity (position) and the force are controlled through the acceleration domain. Thus, the current positions of the actuators are obtained to realize the target function.

Figure 3:
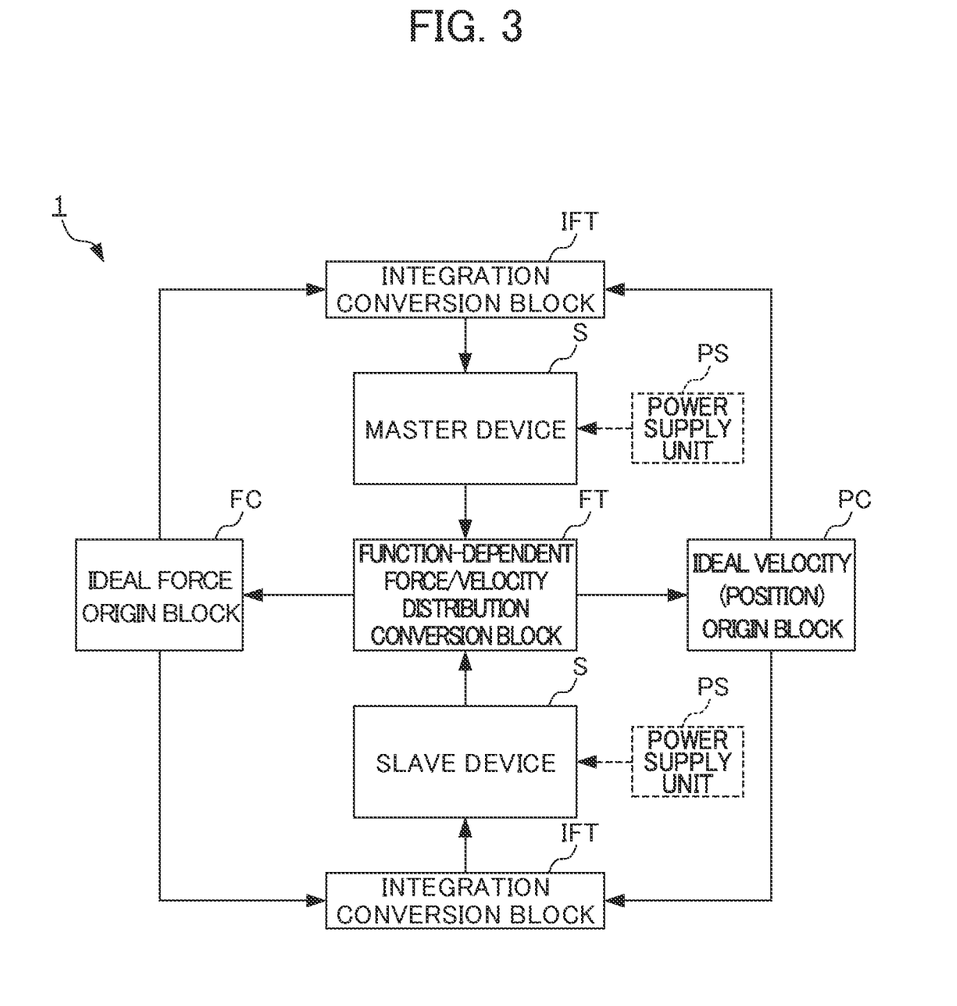
FIG. 3 is a block diagram illustrating the functional configuration of a position/force control system 1 in which the function-dependent force/velocity distribution conversion block FT defines a force/tactile-sense transmission function.
Figure 4:
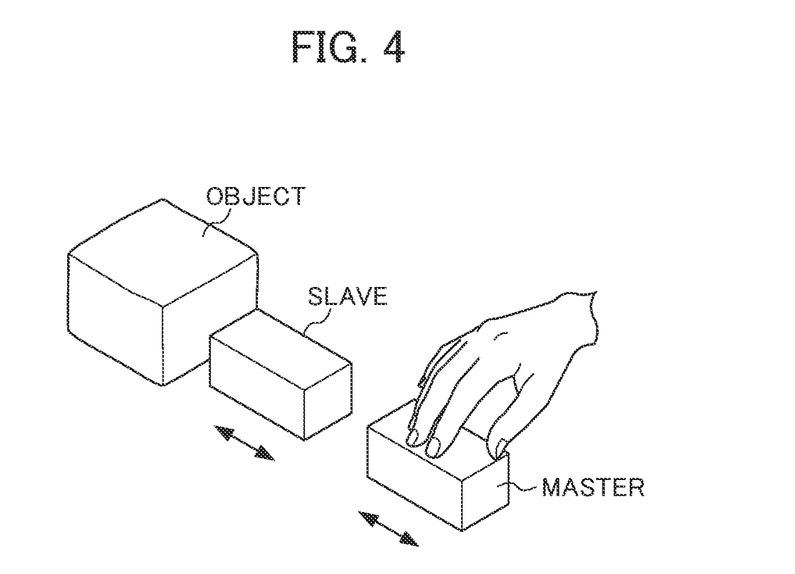
FIG. 4 is a schematic diagram illustrating the concept of a master/slave system for realizing the force/tactile-sense transmission function.

FIG. 3 is a block diagram illustrating the functional configuration of a position/force control system 1 in which the function-dependent force/velocity distribution conversion block FT defines a force/tactile-sense transmission function. FIG. 4 is a schematic diagram illustrating the concept of a master/save system for realizing the force/tactile-sense transmission function. The position/force control system 1 illustrated in FIG. 3 includes a master-side position/force controller, including a master device, and a slave-side position/force controller, including a slave device. The master device and the slave device serve as the control object system S controlled under the control rules illustrated in FIG. 1. The position/force control system 1 may be realized as a system for controlling the master device and the slave device, which include actuators, by using an information processing apparatus including, for example, a PC (Personal Computer) or the like, a memory, a ROM (Read Only Memory), a processor, and a storage device (such as a hard disk).

As illustrated in FIG. 3, as a function defined by the function-dependent force/velocity distribution conversion block FT, operations of the master device may be transmitted to the slave device, and, at the same time, the function (bilateral control function) of feedbacking, to the master device, input of reaction force, which is exerted from an object on the slave device, may be realized.

In this case, the coordinate conversion performed by the function-dependent force/velocity distribution conversion block FT is expressed as in the following Expressions (4) and (5).

[Math. 3]

$$\begin{pmatrix} \dot{x}_p \\ \dot{x}_f \end{pmatrix} = \begin{pmatrix} 1 & -1 \\ 1 & 1 \end{pmatrix} \begin{pmatrix} \dot{x}_m \\ \dot{x}_s \end{pmatrix} \quad (4)$$

$$\begin{pmatrix} f_p \\ f_f \end{pmatrix} = \begin{pmatrix} 1 & -1 \\ 1 & 1 \end{pmatrix} \begin{pmatrix} f_m \\ f_s \end{pmatrix} \quad (5)$$

In Expression (4), $x'_p$ represents the velocity for deriving the state value of the velocity (position); $x'_f$ represents the velocity relating to the state value of force. In addition, $x'_m$ represents the velocity (the derivative value of the current position of the master device) serving as the reference value (input from the master device); $x'_s$ represents the current velocity (the derivative value of the current position) of the slave device. In Expression (5), $f_p$ represents force relating to the state value of the velocity (position); $f_f$ represents force for deriving the state value of force; $f_m$ represents force serving as the reference value (input from the master device); $f_s$ represents the current force of the slave device.

In the present embodiment, as described above, the integration conversion block IFT is capable of seating conversion content different from the simple reverse conversion of the conversion in the function-dependent force/velocity distribution conversion block FT. In terms of the contribution ratio for the control energy, specific conversion content is set.

Figure 5:
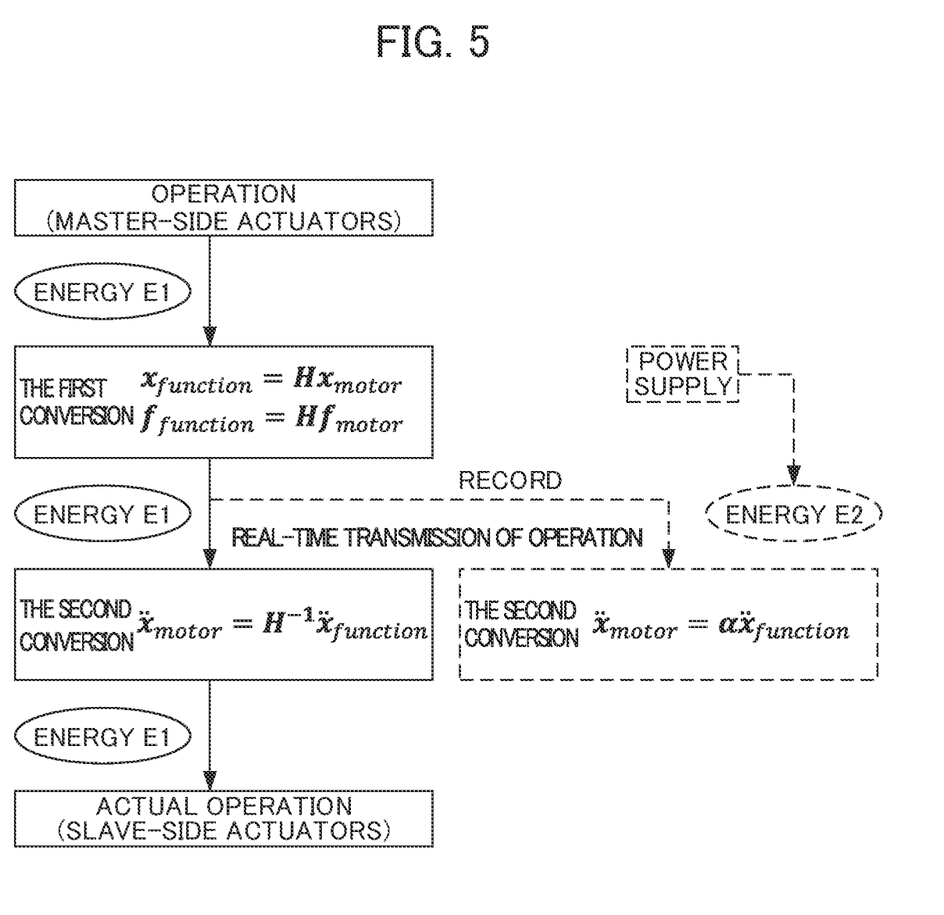
FIG. 5 is a schematic diagram illustrating the concept of application examples obtained in the case where the second conversion in the integration conversion block IFT is set to the reverse conversion of the first conversion, and in the case where the second conversion is set to a conversion other than the reverse conversion of the first conversion.

FIG. 5 is a schematic diagram illustrating the concept of application examples obtained in the case where the second conversion in the integration conversion block IFT is set to the reverse conversion of the first conversion, and in the case where the second conversion is set to a conversion other than the reverse conversion of the first conversion.

FIG. 5 illustrates examples obtained, by using the configuration example in FIGS. 3 and 4, in the case where the contribution ratio between the force control energy and the velocity (position) control energy is maintained and in the case where the contribution ratio is changed.

In the description below, the coordinate conversion corresponding to Expressions (1) and (2) is expressed as in Expressions (6) and (7); the coordinate conversion corresponding to Expression (3) is expressed as in Expression (8).

[Math. 4]

$$x_{function} = H x_{motor} \quad (6)$$

$$f_{function} = H f_{motor} \quad (7)$$

$$\ddot{x}_{motor} = H^{-1} \ddot{x}_{function} \quad (8)$$

In Expression (6), H represents the first conversion matrix; $x_{motor}$ represents a vector whose elements are the reference values and the velocities (positions) based on operations of the actuators; $x_{function}$ represents a vector whose elements are the velocities (positions) in the virtual space in which the first conversion matrix has been used to convert vector $x_{motor}$. In Expression (7), $f_{motor}$ represents a vector whose elements are the reference values and the velocities (positions) based on operations of the actuators; $f_{function}$ a vector whose elements indicate force in the virtual space in which the first conversion matrix has been used to convert vector $f_{motor}$. In Expression (8), $H^{-1}$ represents the reverse conversion of the first conversion matrix; $x''_{motor}$ represents a vector whose elements are acceleration values (variables in the real space) defining input to the actuators; $x''_{function}$ represents a vector whose elements are acceleration values (variables in the virtual space) defined by the velocity (position) control energy and the force control energy calculated in the virtual space.

In FIG. 5, in the case where such a conversion is performed, a master/slave system, in which real-time force-tactile-sense transmission (bilateral control) is performed between the master and the slave, is realized. In the master/slave system, for example, operations which are input to master-side actuators are output in real time (the operations are transmitted in real time) as actual operations of slave-side actuators through the first conversion and the second conversion.

At that time, before and after the first conversion and before and after the second conversion, the control energy is maintained at energy E1.

In contrast, if the second conversion as in Expression (9) is performed in FIG. 5, the control energy is increased or decreased from energy E1 before the second conversion to energy E2 after the second conversion.

[Math. 5]

$$\ddot{x}_{motor} = \alpha \ddot{x}_{function} \quad (9)$$

In Expression (9), α represents a conversion matrix different from the reverse conversion matrix of the first conversion matrix H.

When such a conversion is performed, the control parameters, which are obtained in the bilateral control using the coordinate conversion in Expressions (6) to (8), are recorded, and operations (for example, execution of soft control using a different mechanical impedance) different from the recorded operations of the slave are achieved.

When the conversion in Expression (9) is performed, before and after the second conversion, the control energy is different from that in the case of the bilateral control using the coordinate conversion in Expressions (6) to (8). Thus, power necessary to the operations is different from power supplied to the slave in the bilateral control.

As described above, in the position/force control system 1 according to the present embodiment, the second conversion is applied to the distribution result of the control energy obtained by using the first conversion. Thus, a process, which corresponds to increasing or decreasing performed on at least one of the velocity or position energy and the force energy together or independently, is performed with satisfaction of the condition which is set for the control energy.

Thus, while the control energy is flexibly managed in the target state, power necessary to the control object system may be supplied.

Therefore, the technique for more appropriately realizing functions, which are required for robots, may be provided.

First Modified Example

In the embodiment described above, the first conversion matrix representing a function is used to convert variables in the real space into variables in the virtual space. After the control energy is distributed to the velocity (position) control energy and the force control energy in the virtual space, the second conversion matrix is used to convert values in the velocity (position) and force domains in the virtual space into values in the input domain for the control object system S. In the second conversion, at least one of the velocity (position) and the force may be increased or decreased together or independently with satisfaction of the condition relating to the velocity (position) control energy and the force control energy.

In contrast, the target value, relating to the force, in the ideal force origin block PC and the target value, relating to the velocity (position), in the ideal velocity (position) origin block PC may be set to values for increasing or decreasing at least one of the force control energy and the velocity (position) control energy together or independently. Thus, at least one of the velocity (position) and the force may be increased or decreased together or independently. In this case, the second conversion matrix may be the reverse conversion matrix of the first conversion matrix.

Specifically, when the ideal force origin block FC is to realize a function similar to the function indicated by the reference value, the target value is to be set to zero. In contrast, in the case of scaling, a value, which is obtained by increasing or decreasing information indicating a function that is to be reproduced, may be set. That is, when, for the function indicated by the reference value, the force control energy is to be multiplied by Gf, the target value may be set so that the computation result from the ideal force origin block PC is set to be Gf times the computation result obtained in the case where the computation result follows the reference value.

Similarly, when the ideal velocity (position) origin block PC is to realize a function similar to the function indicated by the reference value, the target value is set to zero. In contrast, in the case of scaling, a value, which is obtained by increasing or decreasing information indicating the function that is to be reproduced, may be set. That is, when, for the function indicated by the reference value, the velocity (position) control energy is to be multiplied by Gp, the target value may be set so that the computation result from the ideal velocity (position) origin block PC is set to Gp times the computation result obtained in the case where the computation result follows the reference value.

However, also in this case, the settable range of the distribution point of the control energy is limited to within the range of the force limit and the velocity limit, which are illustrated in FIG. 2. Therefore, the upper limit value corresponding to the force limit is set for the computation result from the ideal force origin block FC, and the upper limit value corresponding to the velocity limit is set for the computation result from the ideal velocity (position) origin block PC.

Figure 6:
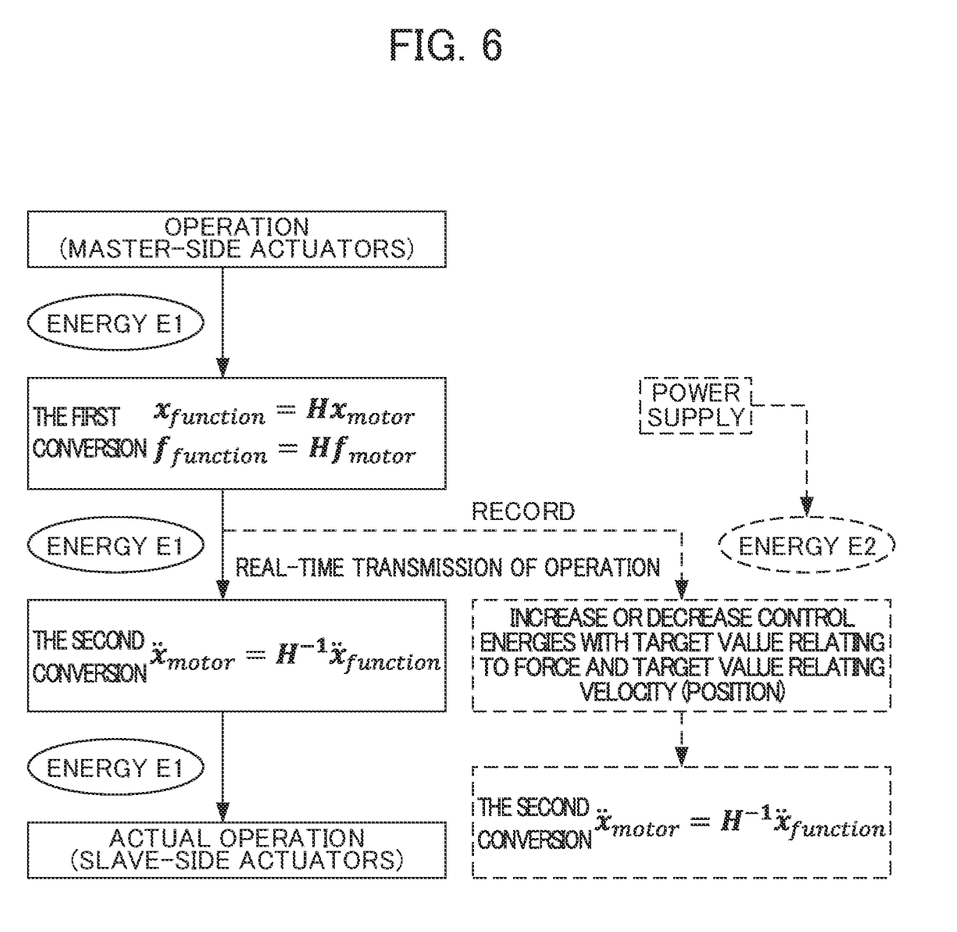
FIG. 6 is a schematic diagram illustrating the concept of application examples obtained in the case where the target value causes the computation result from the ideal force origin block FC and the computation result from the ideal velocity (position) origin block PC to follow the reference value, and in the case where the target value is different from that following the reference value.

FIG. 6 is a schematic diagram illustrating the concept of application examples obtained in the case where the target value causes the computation result from the ideal force origin block PC and the computation result from the ideal velocity (position) origin block PC to follow the reference value, and in the case where the target value is different from that following the reference value.

FIG. 6 illustrates examples obtained, by using the configuration example illustrated in FIGS. 3 and 4, in the case where the contribution ratio between the force control energy and the velocity (position) control energy is maintained and in the case where the contribution ratio is changed.

When the bilateral control using the coordinate conversion in Expression (6) to (8) is performed, a master/slave system, which performs real-time force-tactile-sense transmission (bilateral control) between the master and the client, is realized. For example, in the master/slave system, operations, which are input to master-side actuators, are output in real time (the operations are transmitted in real time) as actual operations of slave-side actuators through the first conversion and the second conversion.

At that time, before and after the first conversion and before and after the second conversion, the control energy is maintained at energy E1.

In contrast, in FIG. 6, when the target value, relating to the force, in the ideal force origin block EC and the target value, relating to the velocity (position), in the ideal velocity (position) origin block PC are set to values for increasing or decreasing at least one of the force control energy and the velocity (position) control energy together or independently, the control energy is increased or decreased from energy E1 to energy E2 in the computation result from the ideal force origin block PC and the computation result from the ideal velocity (position) origin block PC.

When such control is performed, like the control using the coordinate conversion in Expression (9), control parameters, which are obtained in the bilateral control using the coordinate conversion in Expressions (6) to (8), are recorded, and operations different from the recorded operations of the slave (such as soft control performed with a different mechanical impedance) are achieved.

When control indicated as the example of recording in FIG. 6 is performed, in the process from the first conversion to the second conversion (that is, the process in the virtual space), the control energy is increased or decreased. Thus, power necessary for the operations is different from the power supplied to the slave in the bilateral control.

Thus, in the present modified example, in setting of the target values for the distribution result of the control energy obtained through the first conversion, a process, which corresponds to increasing or decreasing performed on at least one of the velocity or position energy and the force energy together or independently, is performed with satisfaction of the condition which is set for the control energy.

The control rules in the present modified example may also cause the control energy to be managed flexibly in the target state, and, at the same time, power necessary for the control object system may be supplied.

Second Modified Example

In the embodiment described above, the whole control energy may be increased or decreased in the stage of input to the control object system S (that is, input to the actuators).

That is, as illustrated in the embodiment described above, the second conversion in the integration conversion block IFT enables at least one of the velocity (position) and the force to be increased or decreased together or independently. In addition, the function of controlling power supply in the power supply unit PS enables an increase or a decrease of the scale of operations of the actuators. In this case, while the contribution ratio between the velocity (position) control energy and the force control energy, which is calculated in the second conversion, is maintained, the whole control energy is increased or decreased.

However, also in this case, the settable range of the distribution point of the control energy is limited to within the range of the force limit and the velocity limit, which are illustrated in FIG. 2. Therefore, in input to the actuators, the upper limit value is set so that the behavior of the actuators is limited to the force limit or less and the velocity limit or less.

When the control rules of the present modified example are used to increase or decrease the whole control energy, output from the actuators is changed in a process other than the first coordinate conversion and the second coordinate conversion. Therefore, the current positions of the actuators used as input in the first coordinate conversion may be corrected in accordance with the degree of the increase or the decrease (that is, the state, in which the control energy has not been increased or decreased, is restored).

Thus, in the present modified example, the second conversion is used to convert the distribution result of the control energy, which is obtained through the first conversion, into variables in the real space. Then, in the stage in which input to the actuators is determined, a process, which corresponds to increasing or decreasing performed on at least one of the velocity or position energy and the force energy together or independently, is performed with satisfaction of the condition which is set for the control energy.

The control rules in the present modified example may also cause the control energy to be flexibly managed in the target state, and, at the same time, power necessary for the control object system may be supplied.

Effects

As described above, in a position/force controller according to a first aspect of the present invention, function-dependent force/velocity distribution conversion means performs first conversion for distributing control energy to at least one of velocity or position energy and force energy, in accordance with a function to be realized, on the basis of velocity (position) and force information, corresponding to information relating to a position based on an operation of an actuator, and information serving as reference of control. Control-amount calculation means calculates at least one of a velocity or position control amount and a force control amount on the basis of at least one of the velocity or position energy and the force energy which are determined through the distribution performed by the function-dependent force/velocity distribution conversion means. Further, integration means integrates the velocity or position control amount with the force control amount, performs second conversion on the velocity or position control amount and the force control amount so as to return the integrated output to the actuator, and determines input to the actuator. The process of determining input to the actuator from the distribution result of the control energy obtained through the first conversion includes an increase/decrease process, corresponding to increasing or decreasing performed on at least one of the velocity or position energy and the force energy together or independently, with satisfaction of a condition that is set for the control energy.

The second conversion is applied to the distribution result of the control energy obtained through the first conversion. Thus, a process, which corresponds to increasing or decreasing performed on at least one of the velocity or position energy and the force energy together or independently, is performed with satisfaction of the condition which is set for the control energy.

Thus, while the control energy is flexibly managed in the target state, power necessary for the control object system may be supplied.

Therefore, the technique for more appropriately realizing functions required for robots may be provided.

The present invention is not to be limited to the above-described embodiment. Various changes, modifications, etc. are also covered by the present invention as long as such changes, modifications, etc. fall in a range in which the object of the present invention can be achieved.

For example, the embodiment and modified examples described above may be combined with each other appropriately. In this case, among the embodiment and the first and second modified examples described above, a position/force controller obtained by combining two or more configurations may be obtained.

In the embodiment and the first and second modified examples, when the velocity or position control energy or the force energy is decreased, the energy may be set to zero (that is, the control amount of the velocity or position or the control amount of the force is made ineffective). In this case, among the control rules of the present invention, one of the position or velocity control and the force control may be used.

The process in the embodiment and the like may be performed through hardware or software.

That is, any configuration may be employed as long as a function for performing the process described above is provided for the position/force control system 1. The functional configuration and the hardware configuration for realizing the function are not limited to the examples described above.

When the process described above is performed through software, programs constituting the software are installed from a network or a storage medium to a computer.

The storage medium that stores the program is constituted by, for example, a removable medium that is distributed separately from the device body, or a storage medium that is previously built in the device body. The removable medium is constituted by, for example, a magnetic disk, an optical disc, or a magneto-optical disk. The optical disc is constituted by, for example, a CD-ROM (Compact Disk-Read Only Memory), a DVD (Digital Versatile Disk), or a Blu-ray Disc (trademark). The magneto-optical disk is constituted by, for example, a MD (Mini-Disk). The storage medium that is previously built in the device body is constituted by, for example, a hard disk or ROM in which the program is stored.

The above embodiment is an example to which the present invention is applied, and does not limit the technical scope of the present invention. That is, the present invention may be subjected to various modifications such as omission and replacement without deviating from the spirit of thereof, and various embodiments other than that described above may be implemented. Various embodiments and modifications thereof that can be implemented in the present invention are included in the scope of the invention described in the claims and an equivalent scope.

REFERENCE SIGNS LIST

S control object system
FT function-dependent force/velocity distribution conversion block (function-dependent force/velocity distribution conversion means)
FC ideal force origin block (force control-amount calculation means)
PC ideal velocity (position) origin block (position control-amount calculation means)
IFT integration conversion block (integration means)
PS power supply unit

The invention claimed is:

1. A position/force controller comprising:
an actuator that acts on an object by output and receives a reaction force from the object as input;

a function-dependent force or velocity distribution converter for performing a first conversion for distributing control energy to at least one of velocity or position energy and force energy, the distributing being performed in accordance with a control function of velocity and force that is being realized as an action of the actuator, the distributing being performed based on velocity or position information and force information and information serving as reference of control, the velocity or position information and force information corresponding to information relating to a position based on an operation of the actuator;

a control-amount calculator for calculating at least one of a velocity or position control amount and a force control amount, the calculating being performed based on at least one of the velocity or position energy and the force energy, the velocity or position energy and the force energy being determined through the distribution performed by the function-dependent force or velocity distribution converter; and an integrator for integrating the velocity or position control amount with the force control amount, performing a second conversion on the velocity or position control amount and the force control amount so as to return the integrated output to the actuator, and determining input to the actuator, wherein:

the determining input to the actuator from the distribution result of the control energy obtained through the first conversion includes an increase/decrease process corresponding to increasing or decreasing performed on at least one of the velocity or position energy and the force energy together or independently, the increase/decrease process being performed based on a condition that is set for the control energy, the function-dependent force or velocity distribution converter converts a first coordinate system, in which a velocity or position and a force are related to each other in real space, to a second coordinate system, in which the velocity or position and the force are independent of each other in virtual space through the first conversion, the control-amount calculator determines a distribution point of the velocity or position energy and the force energy within a range defined by limits of velocity or position, force, and supplied energy in the second coordinate system, the integrator determines the input to the actuator based on the velocity or position energy and the force energy corresponding to the determined distribution point through the second conversion, and in the increase/decrease process corresponding to increasing or decreasing performed on at least one of the velocity or position energy and the force energy together or independently, at least one of the velocity or position energy and the force energy is changed within the range defined by the limits of velocity or position, force, and supplied energy in the second coordinate system.

2. The position/force controller according to claim 1, wherein the second conversion is a conversion different from reverse conversion of the first conversion, and at least one of the velocity or position control amount and the force control amount is increased or decreased together or independently.

3. The position/force controller according to claim 1, wherein the second conversion is reverse conversion of the first conversion, and the whole energy is increased or decreased in output from the integrator.

4. The position/force controller according to claim 1, further comprising:

a second actuator different from the actuator, wherein the actuator operates as one of a master device and a slave device, and the second actuator operates as the other one of the master device and the slave device.

5. The position/force controller according to claim 1, wherein, based on a parameter obtained in bilateral control performed between the actuator operating as one of a master device and a slave device and another actuator operating as the other of the master device and the slave device, the actuators are controlled in a state in which the velocity or position energy and the force energy for the master device are different from the velocity or position energy and the force energy for the slave device.

6. A position/force control method executed by a position/force controller having an actuator that acts on an object by output and receives a reaction force from the object as input, the position/force control method comprising:

performing a first conversion for distributing control energy to at least one of velocity or position energy and force energy, the distributing being performed in accordance with a control function of velocity and force that is being realized as an action of the actuator, the distributing being performed based on velocity or position information and force information and information serving as reference of control, the velocity or position information and force information corresponding to information relating to a position based on an operation of the actuator;

calculating at least one of a velocity or position control amount and a force control amount, the calculating being performed on the basis of at least one of the velocity or position energy and the force energy, the velocity or position energy and the force energy being determined through the distribution; and integrating the velocity or position control amount with the force control amount, performing a second conversion on the velocity or position control amount and the force control amount so as to return the integrated output to the actuator, and determining input to the actuator, wherein:

the determining input to the actuator from the distribution result of the control energy obtained through the first conversion includes an increase/decrease process corresponding to increasing or decreasing performed on at least one of the velocity or position energy and the force energy together or independently, the increase/decrease process being performed based on a condition that is set for the control energy, the performing the first conversion converts a first coordinate system, in which a velocity or position and a force are related to each other in real space, to a second coordinate system, in which the velocity or position and the force are independent of each other in virtual space through the first conversion, the calculating at least one of the velocity or position control amount and the force control amount determines a distribution point of the velocity or position energy and the force energy within a range defined by limits of velocity or position, force, and supplied energy in the second coordinate system, the integrating the velocity or position control amount with the force control amount determines the input to the actuator based on the velocity or position energy and the force energy corresponding to the determined distribution point through the second conversion, and in the increase/decrease process corresponding to increasing or decreasing performed on at least one of the velocity or position energy and the force energy together or independently, at least one of the velocity or position energy and the force energy is changed within the range defined by the limits of velocity or position, force, and supplied energy in the second coordinate system.

7. A non-transitory storage medium encoded with a computer-readable program that is executable by a processor of a computer of a position/force controller having an actuator that acts on an object by output and receives a reaction force from the object as input, the program being executable by the processor to control the processor to perform operations comprising:

performing a first conversion for distributing control energy to at least one of velocity or position energy and force energy, the distributing being performed in accordance with a control function of velocity and force that is being realized as an action of the actuator, the distributing being performed based on velocity or position information and force information and information serving as reference of control, the velocity or position information and force information corresponding to information relating to a position based on an operation of the actuator;

calculating at least one of a velocity or position control amount and a force control amount, the calculating being performed based on at least one of the velocity or position energy and the force energy, the velocity or position energy and the force energy being determined through the distribution; and integrating the velocity or position control amount with the force control amount, performing a second conversion on the velocity or position control amount and the force control amount so as to return the integrated output to the actuator, and determining input to the actuator, wherein:

the determining input to the actuator from the distribution result of the control energy obtained through the first conversion includes an increase/decrease process corresponding to increasing or decreasing performed on at least one of the velocity or position energy and the force energy together or independently, the increase/decrease process being performed based on a condition that is set for the control energy, the performing the first conversion converts a first coordinate system, in which a velocity or position and a force are related to each other in real space, to a second coordinate system, in which the velocity or position and the force are independent of each other in virtual space through the first conversion, the calculating at least one of the velocity or position control amount and the force control amount determines a distribution point of the velocity or position energy and the force energy within a range defined by limits of velocity or position, force, and supplied energy in the second coordinate system, the integrating the velocity or position control amount with the force control amount determines the input to the actuator based on the velocity or position energy and the force energy corresponding to the determined distribution point through the second conversion, and in the increase/decrease process corresponding to increasing or decreasing performed on at least one of the velocity or position energy and the force energy together or independently, at least one of the velocity or position energy and the force energy is changed within the range defined by the limits of velocity or position, force, and supplied energy in the second coordinate system.

* * * * *